April 1, 1958

J. A. HARDMAN 2,828,906

ENGINE

Filed Dec. 30, 1954

INVENTOR
JAMES A. HARDMAN

BY Harold T. Stowell

ATTORNEY

April 1, 1958

J. A. HARDMAN 2,828,906

ENGINE

Filed Dec. 30, 1954

INVENTOR
JAMES A. HARDMAN

BY Harold T. Stowell

ATTORNEY

April 1, 1958  J. A. HARDMAN  2,828,906
ENGINE
Filed Dec. 30, 1954  8 Sheets-Sheet 3
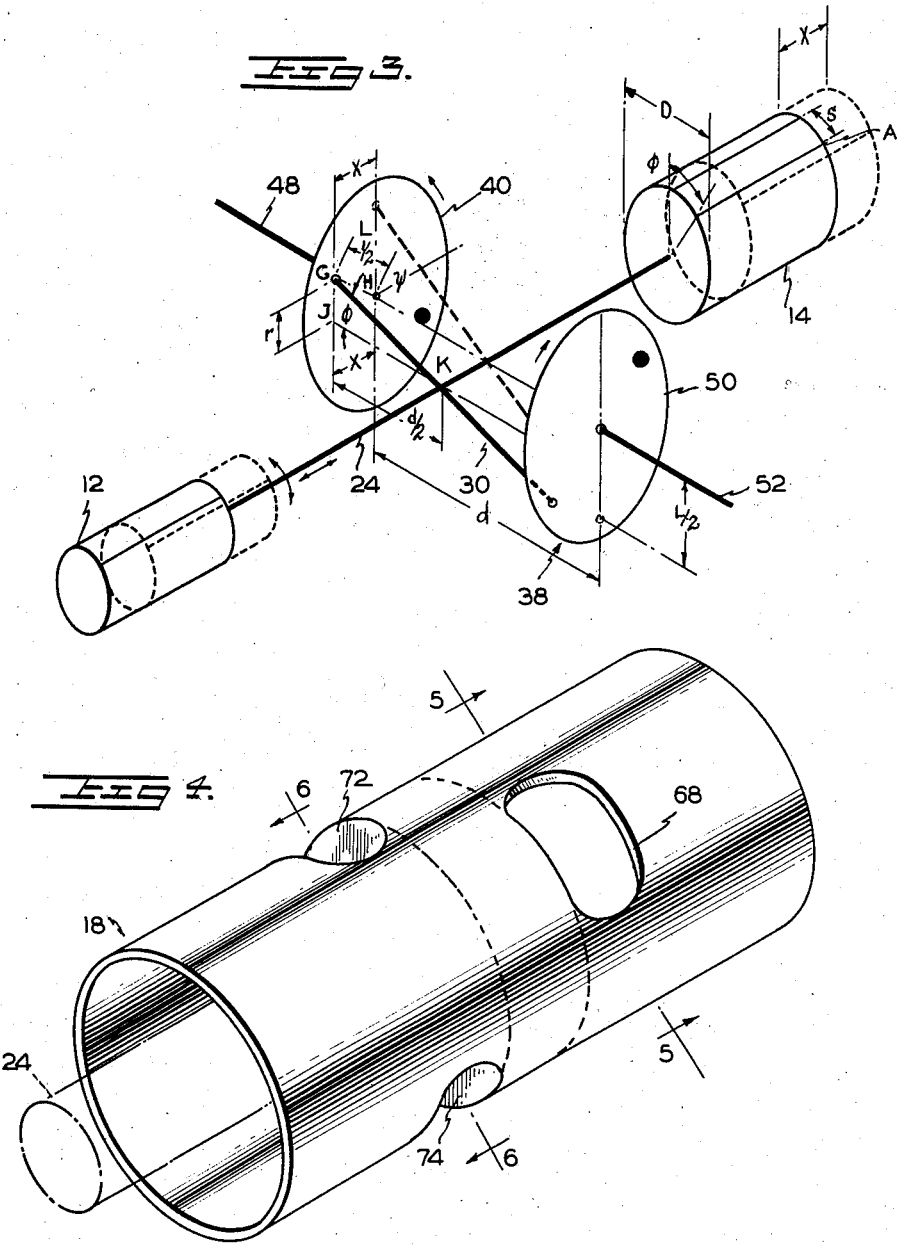
INVENTOR
JAMES A. HARDMAN
BY Harold T. Stowell
ATTORNEY April 1, 1958 J. A. HARDMAN 2,828,906
ENGINE
Filed Dec. 30, 1954 8 Sheets-Sheet 4
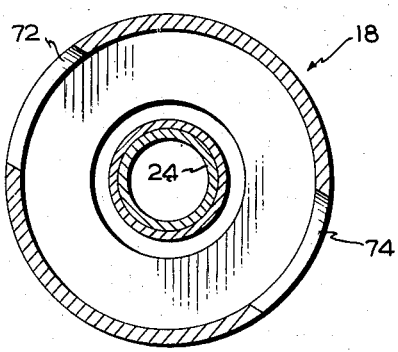
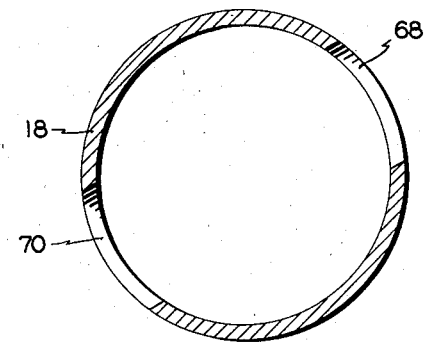
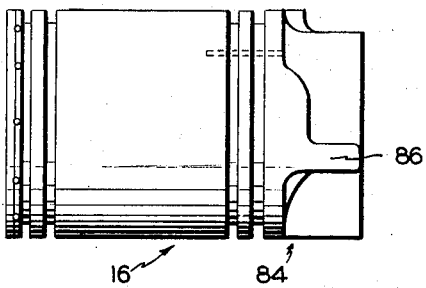
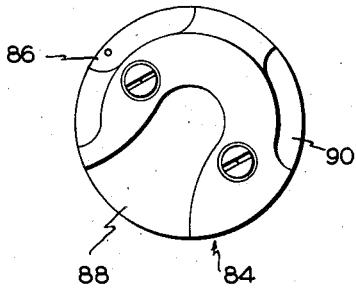
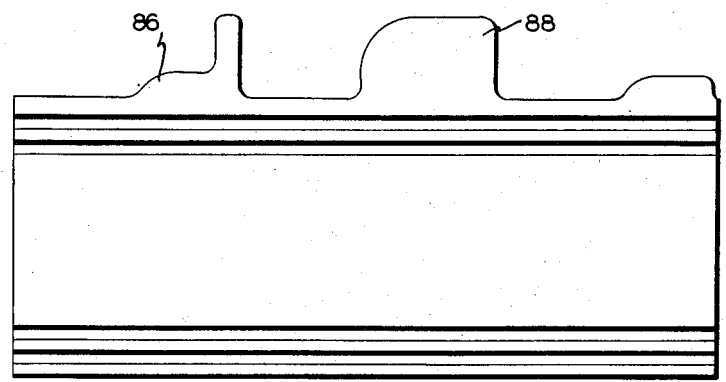
INVENTOR
JAMES A. HARDMAN
BY *Harold T. Stowell*
ATTORNEY

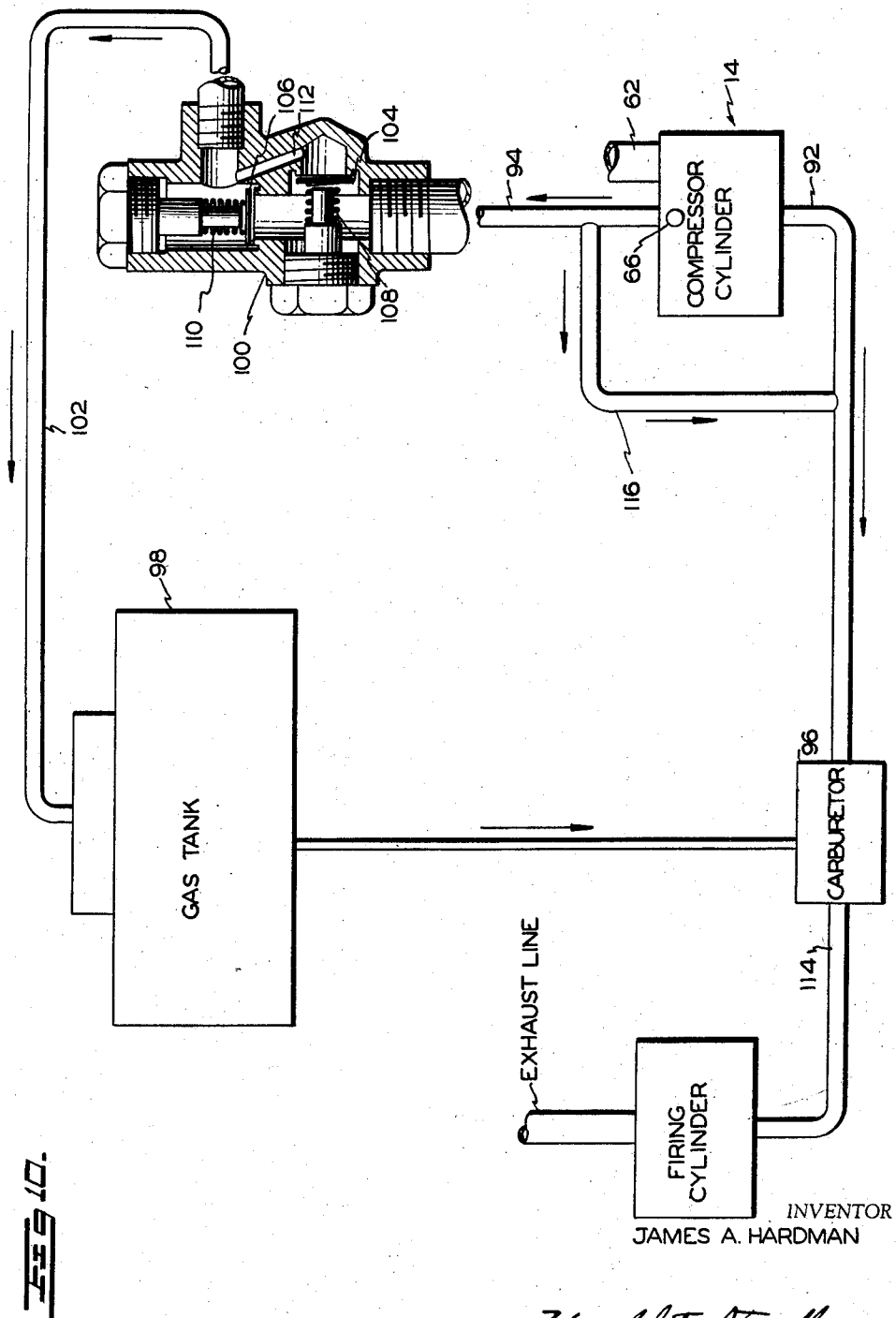

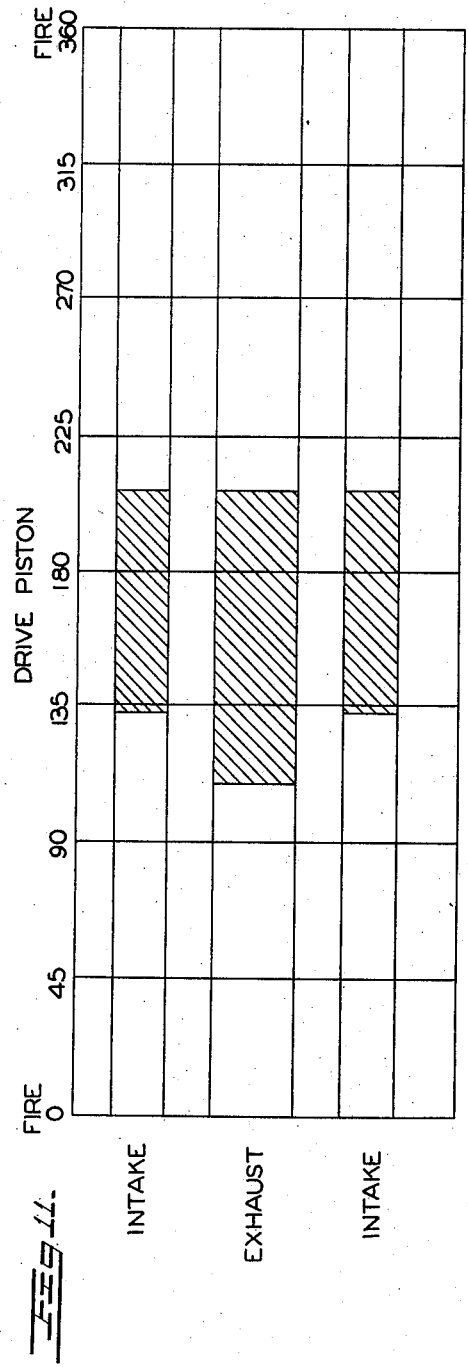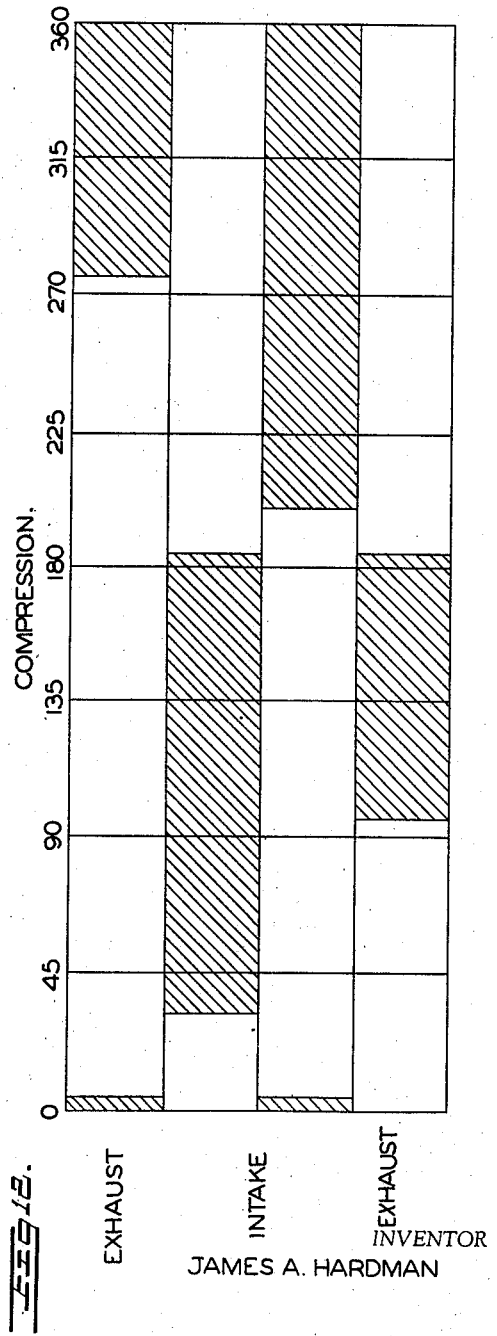

April 1, 1958　　　J. A. HARDMAN　　　2,828,906
ENGINE
Filed Dec. 30, 1954　　　8 Sheets-Sheet 7

INVENTOR
JAMES A. HARDMAN
BY Harold T. Stowell
ATTORNEY

April 1, 1958 J. A. HARDMAN 2,828,906
ENGINE
Filed Dec. 30, 1954 8 Sheets-Sheet 8

INVENTOR
JAMES A. HARDMAN

BY Harold T. Stowell

ATTORNEY

United States Patent Office

2,828,906
Patented Apr. 1, 1958

2,828,906

ENGINE

James Abraham Hardman, Logan, Utah

Application December 30, 1954, Serial No. 478,570

5 Claims. (Cl. 230—56)

This invention relates to a new and improved engine, and in particular to a piston and cylinder engine wherein the pistons have both axial and rotative movement in relation to their cylinders.

The invention has particular application to fluid compressors or pumps, fluid pressure engines, internal combustion engines, and combination internal combustion engines and pumps.

In the past in the operation of internal combustion engines of the Otto or diesel cycle type it has been necessary to provide mechanically actuated valves for controlling the intake and exhaust cycles thereof, which valves must be interconnected by gearing and timing mechanisms with the crank shafts of the engines. Mechanically actuated valves in such engines have been constant sources of operational problems and expense, not only due to the added weight of such mechanisms, but also due to the problems involved in their proper cooling and adjustment for efficient operation of the motor. For these reasons the two-cycle internal combustion engine, even with its substantially lower efficiency, has been widely used where the greater expense of the Otto or diesel cycle engine would be prohibitive, and where small and light weight engines are required.

Similarly in the field of reciprocating piston type compressors and pumps the problem of providing efficient valve means for the control of pressure fluid to and from the cylinders has necessitated the use of large cylinders and pistons adapted to be driven at substantially low speeds.

While the operation of the prior art compressors and pumps at low speeds does not present difficulties where the prime mover is one that can be operated at constant speed, particular difficulties have arisen in the field of automotive air conditioning where it is desired to drive the air conditioner compressor from the automotive prime mover which must operate through a wide and varying range of speeds.

Through the expedient of the present invention providing a piston have both reciprocating and rotative movement in relation to its cylinder, it has been found that very efficient and versatile engines are provided which may be operated through a substantial range of speeds. The reciprocating and rotating piston permits valving by providing inlet and outlet ports in the cylindrical wall of the cylinder, and by providing cooperating ports in or crowns on the piston so shaped that as the piston reciprocates and rotates within the cylinder positive and efficient valving of the inlet and outlet ports is obtained without the employment of further mechanical elements in the engine.

Through the use of such expedients it has been found that the efficiency of Otto and diesel cycle engines is obtainable in the two-cycle method of operation of internal combustion engines and compressors and pumps which may be operated at either high or low speeds or speeds intermediate thereof are provided.

While other motion transforming mechanisms may be employed for interconnecting the pistons of the engine of the invention to obtain the necessary reciprocating and rotating motion of the piston, the motion transforming mechanism disclosed and claimed in my United States Patent 2,480,854, issued September 6, 1949, has been found to be particularly advantageous as the primary transmission means for the engine of the present invention. The invention will, therefore, be more fully described in reference to the embodiments illustrated in the accompanying drawings wherein the motion transforming mechanism is of the type claimed in my prior United States patent.

However, it is to be particularly pointed out that the disclosure of the present invention as shown in the accompanying drawings is not intended to be a limitation as to the size, configuration or exact arrangement of parts, but such disclosures are but illustrative examples of the advantageous applications of the construction and principles constituting the present invention.

In addition to the aforementioned advantages of the present invention other principal objects are:

To so arrange and construct an engine that it will be simple as to its parts and relatively economical to manufacture and efficient to operate.

To obtain an engine having a substantially perfect balance.

To eliminate power absorbing and stress creating side thrusts in the transformation of the reciprocating and rotary motion of the piston into rotary motion or vice versa. To provide a piston and cylinder engine having lapped fits whereby the engine may be efficiently operated without the use of piston rings or where such use is desired to substantially reduce the wear thereon.

To provide an internal combustion engine or combination internal combustion engine and pump or compressor whereby the engine may be operated with standard carburization systems or by means of a pressurized fuel air supply obtainable from the compressor operated in opposed synchronism with the reciprocation of the power developing piston.

To provide such an engine having a plurality of cylinders, for example two or four, which cylinders are arranged in alignment one with another so that a single reciprocable power rod can extend in common through all the cylinders.

To reduce to a minimum the weight of the reciprocating and rotating masses as well as to reduce the number of separate operating parts of an engine.

To provide such an engine having a reciprocating and rotating piston wherein the functions of standard piston and connecting rods are combined in one and the same member resulting in a single, straight line rod which extends from a point of motive power application to substantially the point of motion transformation, and which moves always in the same straight line.

These and other objects and advantages are accomplished by the parts, constructions, and arrangements comprising the present invention, the nature of which is set forth in the following general statement, and is illustrative of that which is set forth in the following description illustrated in the accompanying drawings.

The nature of the present invention will be stated in general terms as including a cylinder, a piston reciprocable in said cylinder, a power rod attached to the piston, port openings in said cylinder, and guide means coacting with said power rod to urge said piston into rotation about its axis synchronously with the reciprocation thereof to cause the piston to open and close said ports in predetermined timed relation to the reciprocations.

Referring to the accompanying drawings in which like designations indicate similar parts throughout the several views:

Fig. 1a is a section of the power piston of the engine of Fig. 1 substantially on line 1a—1a of Fig. 1;

Fig. 3 is a diagrammatic perspective view of the motor-compressor shown in Figs. 1 and 2;

Fig. 4 is an enlarged perspective view of the compressor piston of the motor-compressor unit of Figs. 1 through 3 showing one form of valve port arrangement;

Fig. 5 is a section substantially on line 5—5 of Fig. 4;

Fig. 6 is a section substantially on line 6—6 of Fig. 4;

Fig. 7 is an enlarged side elevation of the internal combustion piston of the motor-compressor shown in Figures 1 through 3;

Fig. 8 is the top plan view of the piston shown in Fig. 7; and

Fig. 9 is a developed view of the piston shown in Figs. 7 and 8;

Fig. 10 is a diagrammatic view of a preferred form of the carburetion system of the motor shown in Figures 1 through 3;

Fig. 11 is a diagrammatic chart of a representative intake and exhaust cycle of the engine shown in Figures 1 to 3;

Fig. 12 is a diagrammatic chart of the compressor cycle of the motor compressor shown in Figures 1 to 3;

Fig. 15 is a diagrammatic perspective view of an engine having a plurality of cylinders longitudinally interconnected in accordance with the principles of the invention.

Figure 1:
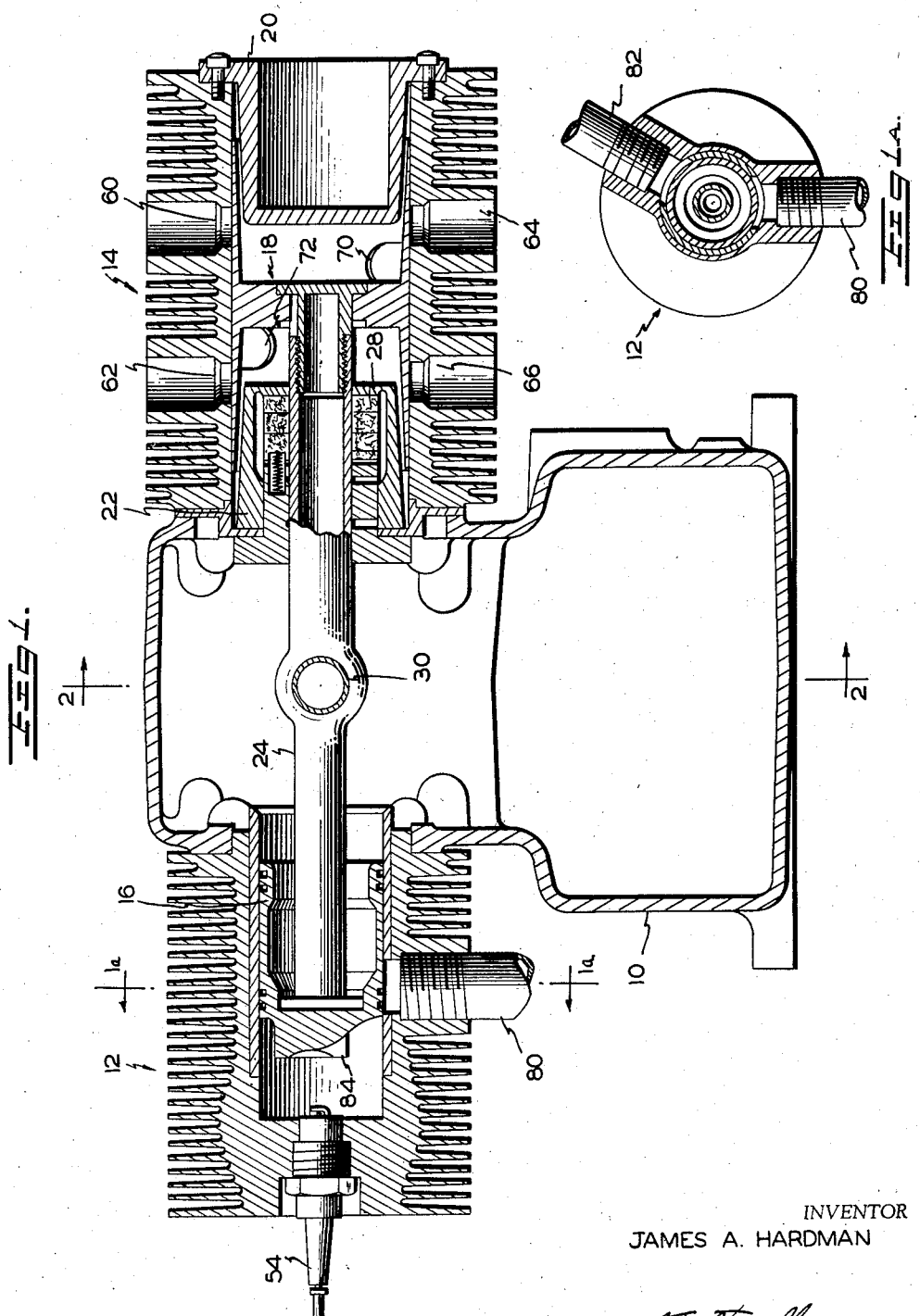
Fig. 1 is a sectional view of a motor-compressor engine constructed in accordance with the principles of the present invention with elements omitted for clarity.
Figure 2:
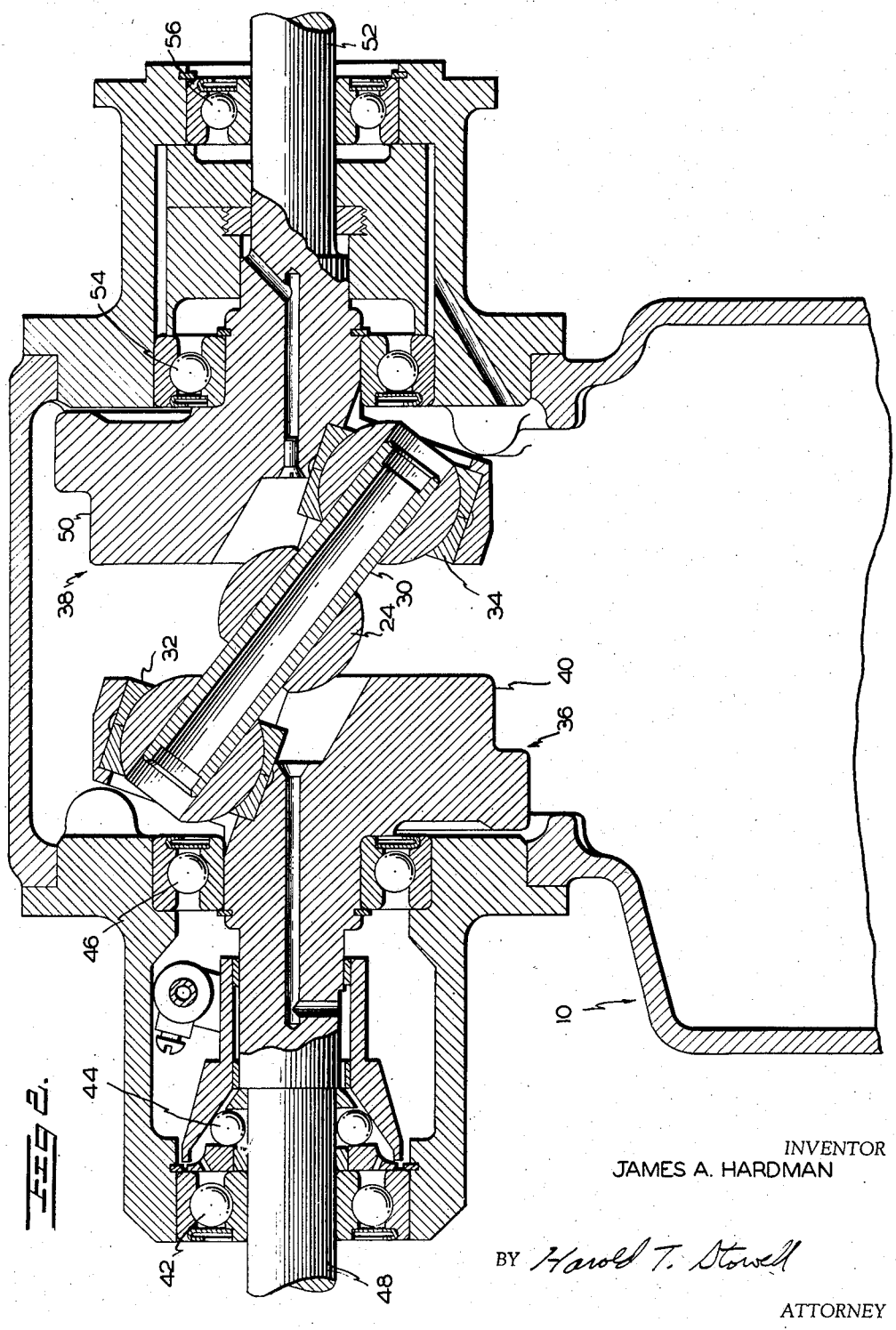
Fig. 2 is an enlarged fragmentary sectional view substantially on line 2—2 of the motor-compressor shown in Fig. 1 showing details of the preferred form of the motion transforming mechanism for converting reciprocating motion to rotary or vice versa and to urge the power rod into rotation about its axis.

Referring to the drawings and in particular Figures 1 and 2 thereof there is shown therein one illustrative example of the present invention embodied in a combination internal combustion engine and compressor. In the drawings 10 generally designates the engine housing having internal combustion or firing cylinder 12 and compressor cylinder 14 positioned on opposite sides of the housing 10 in rectilinear alignment. Reciprocably and rotatably mounted in cylinder 12 is single acting firing piston 16, while a double acting compressor piston 18 is similarly mounted in compressor cylinder 14. Since, as illustrated in the drawings, the compressor is double acting cylinder 14 provided with piston heads 20 and 22 secured at both ends thereof.

Pistons 16 and 18 are rigidly interconnected by power rod 24, which rod may or may not be of tubular construction as shown in the drawing to lighten the mass of the engine and to aid in cooling thereof. On the double acting compressor section of the engine the power rod 24 extends through the inner cylinder head 22, within which are a plurality of resilient sealing rings 28 which prevent the passage of lubricating oil from the motor into the compressor cylinder proper and the passage or leakage of compressed air from the cylinder into the engine housing.

A shuttle bar or rod 30 is secured to the power rod 24 intermediate its length, which rod like the power rod may be of tubular construction and is journalled eccentrically at each of its ends in bearings 32 and 34 to rotor elements 36 and 38 respectively.

The rotor elements 36 and 38 are in the form of a pair of fly wheels disposed on opposite sides of the shuttle rod and at right angles to cylinders 12 and 14. Rotor element 36 has a counter weight 40 opposite the bearing connection 32 and is rotatably mounted in the housing 10 by bearings 42, 44 and 46 through shaft 48 which shaft may be coupled to a cooling fan not shown in the drawings for the engine.

Rotor element 38 is also provided with a counter weight designated 50 opposite to the bearing connection 34 and is rotatably mounted in housing 10 through shaft 52 and bearings 54 and 56. The shaft 52 may be connected to a magneto and/or timing device for the spark plug 54 as is well known in the art and not shown in the drawings for clarity of the novel elements of the invention.

The operation of the mechanical elements hereinabove described may be more clearly seen from the diagrammatic view of the motor compressor shown in Fig. 3. As the internal combustion piston 16 reciprocates, power rod 24 reciprocates axially in a straight line reciprocating compressor piston 18, and the shuttle rod 30, which is interconnected at its ends to the rotors 36 and 38, transforms the reciprocating motion into rotary motion and rotates rotors 36 and 38 in opposite directions. As the shuttle bar 30 transforms the reciprocating motion of the power rod 24 through rotors 36 and 38 into rotary motion it oscillates back and forth at right angles to the longitudinal axis of the power rod 24. This oscillation in turn rotates or oscillates power rod 24 and its connected pistons 16 and 18.

The counter weights 40 and 50, secured to rotors 36 and 38 respectively, in addition to their normal function as fly wheels also function to balance the reciprocating mass of the piston 16 and 18 and power rod 24. In conventional engines where counter balance fly wheels are used to balance reciprocating masses, the weights become substantially large when the mass of the pistons and reciprocating power rod is large thus imposing a rocking couple which induces overall vibration to the engine. However, in the present engine where the pistons 16 and 18 and power rod 24 also oscillate the work of accelerating and decelerating these oscillating masses opposes the rocking couple induced by the counter weights 40 and 50 providing a substantially balanced engine construction.

With further reference to Fig. 3 of the drawings the development of the piston trace on the cylinder wall will be described. The importance of the piston trace on the cylinder wall will be more fully appreciated from the description of the valving arrangement of the power and compressor pistons set forth hereinafter.

The curve traced on the inside of the cylinder wall by a point A on the piston may be defined by an equation relating $x$ and $s$ where:

$x$ = distance of point A from its position at midstroke measured parallel to the piston axis.

$s$ = rotation of point A, or the length of arc to A measured from the top element.

From the geometry of the piston $$S = \frac{D}{2}\phi \qquad (1)$$

where $D$ = diameter of the piston.
$\phi$ = rotation of the piston in radians about its own axis measured from its position at the end of the stroke.

($\phi$ is in radians.)

But from triangle $$GJK, \quad \phi = \tan^{-1}\left(\frac{2r}{d}\right) \qquad (2)$$

where $r = \frac{1}{2}\sqrt{L^2 - 4x^2}$ from triangle $GJH \cdot L$ = length of stroke.
$d$ = distance between center lines of the shuttle bearings in the rotors.

Substituting Equation 2 in Equation 1:

$$S = \frac{D}{2} \tan^{-1} \frac{\sqrt{L^2 - 4x^2}}{d}$$

Keeping in mind the above general discussion of the piston trace upon the cylinder wall a specific example of valving for a double acting compressor cylinder will now be described in particular reference to Figures 1, 4, 5, 6 and 12 of the illustrated embodiments of the invention.

In Fig. 1 it will be seen that cylinder 14 has two inlet ports 60 and 62 and two outlet ports 64 and 66. Inlet port 60 and outlet port 64 cooperate with ports 68 and 70 respectively in piston 18 to provide the valving mechanism for one side of the double acting piston, while inlet port 62 and outlet port 66 cooperate with ports 72 and 74 respectively of the outer half of the double acting piston 18; the ports 68, 70, 72 and 74 being more clearly shown in Figs. 4, 5 and 6. The angular relationship between the cylinder ports and the piston ports may be calculated from the piston trace on the cylinder wall, and considering only one stage of the double acting piston it will be seen that as the piston 18 moves inwardly inlet port 60, in the cylinder, registers with inlet port 68 in the piston to admit air into the cylinder chamber. At the end of the stroke the piston port 68 and cylinder port 60 are rotated out of alignment and the piston moves towards the piston head 20 compressing the air therein. At, for example approximately the 270° position of the piston 18 exhaust port 64 in the cylinder and exhaust port 70 in the piston are rotated into axial alignment and the compressed air proceeds to issue from the cylinder.

Exemplary of one complete cycle of operation of the double stage compressor is shown graphically in Fig. 12 of the drawings. It is to be understood, however, that many variations in the cyclic process may be had depending on whether the piston is double or single acting and also on the degree of compression required from the unit. It is also evident that the geometric configuration of the inlet and outlet ports in the cylinder and the cooperating ports in the piston will vary with varying diameter of the cylinder, stroke of the piston, and size and space relationships between the shuttle arm and the rotors, in accordance with the formulas for developing the piston trace on the cylinder wall.

The firing or power-cylinder unit of the engine will now be described with reference to Figs. 1, 1A and 7 through 11.

The firing cylinder 12 is provided with radial bores 80 and 82 for the intake and exhaust gases as more clearly shown in Fig. 1A, when operated under a pressurized carburization system as to be more fully described hereinafter.

The radial displacement of the inlet and outlet ports 80 and 82 is dependent upon the rotation and stroke of the piston 16 within the cylinder and the configuration of the crown 84 thereof. The crown 84 of the piston 16 is provided with peripheral extensions 86, 88 and 90, which are so spaced and shaped, in relation to ports 80 and 82 and the rotation and reciprocation of the piston, to open and close ports 80 and 82 in predetermined time relationship with the two-cycle firing order of the motor.

The particular firing, intake and exhaust cycle of the piston-cylinder unit shown for example in Figures 1, 1A, 7, 8 and 9 is represented diagrammatically in Fig. 11.

A pressurized system for supplying the fuel-air mixture to inlet port 82 of cylinder-piston arrangement 16—12 is diagrammatically shown in Fig. 10. In Fig. 10 outlet port 66 of the compressor cylinder 14 is shown connected to conduits 92 and 94. Conduit 92 directs compressed air through the carburetor 96 while conduit 94 is connected to the top of gas tank 98 through valve 100 and conduit 102. The valve 100 is provided with two spring biased valve plates 104 and 106, which are urged into the closed position by springs 108 and 110 respectively. During the compression stroke of compressor piston 14 compressed air opens valve seat 106 permitting compressed air to pressurize the tank 98, and on the intake stroke of the compressor cylinder valve seat 106 is closed by spring 110 so that the compressed air within the gas tank 98 is prevented from returning through the valve. In order to prevent too great a pressure from accumulating in the gas tank 98 an internal valve passage 112 is provided whereby pressure fluid on the gas tank side of valve seat 106 may bleed back into line 94 past valve seat 104. The tensions in springs 110 and 108 are so arranged that spring 110 nearly holds the valve against its seat while spring 108 is provided with enough tension to hold the required amount of extra pressure in the gas tank 98 over the pressure desired in the carburetor.

From the carburetor 96 a fuel air manifold 114 directs the fuel air mixture to the inlet port 82 of the cylinder 12. As shown in the drawings a by-pass conduit 116 may be provided between conduits 92 and 94 to equalize pressures therein.

As hereinbefore described in reference to the compressor piston-cylinder arrangement, the geometric configuration of the inlet and exhaust ports in the cylinder and the cooperating crown structure in the piston may be varied in accordance with the diameter of the cylinder, the stroke of the piston, the size and space relationship between the shuttle arm and the rotors, and the form of the carburization system employed with the motor. It is also evident that the shaped crown of the firing piston may be substituted for cooperating ports as explained in reference to the compressor cylinder.

Figure 13:
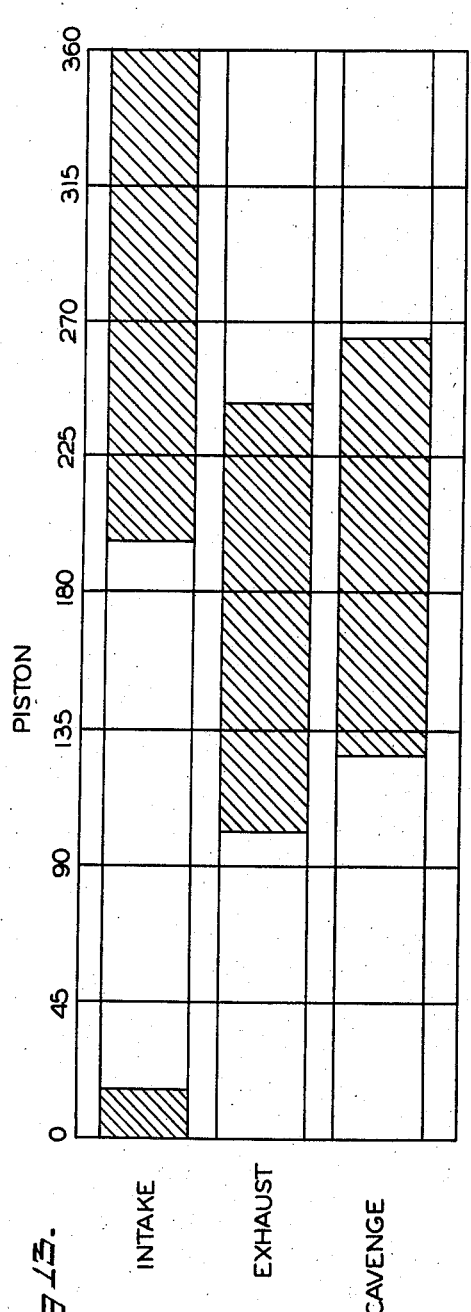
Fig. 13 is a diagrammatic chart of the intake and exhaust cycle of a modified engine constructed in accordance with the teachings of the invention.
Figure 17:
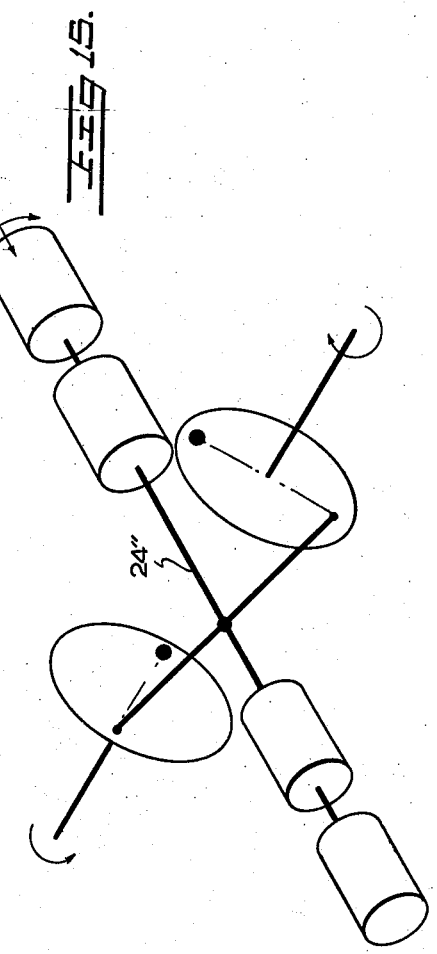

The firing piston of the engine of the invention may also be very effectively operated employing the standard two-cycle fuel air operation having scavenge-intake and exhaust strokes. Fig. 13 of the illustrated embodiments of the invention shows diagrammatically a typical scavenge-intake and exhaust arrangement which may be employed in the engine of the present invention.

Figure 14:
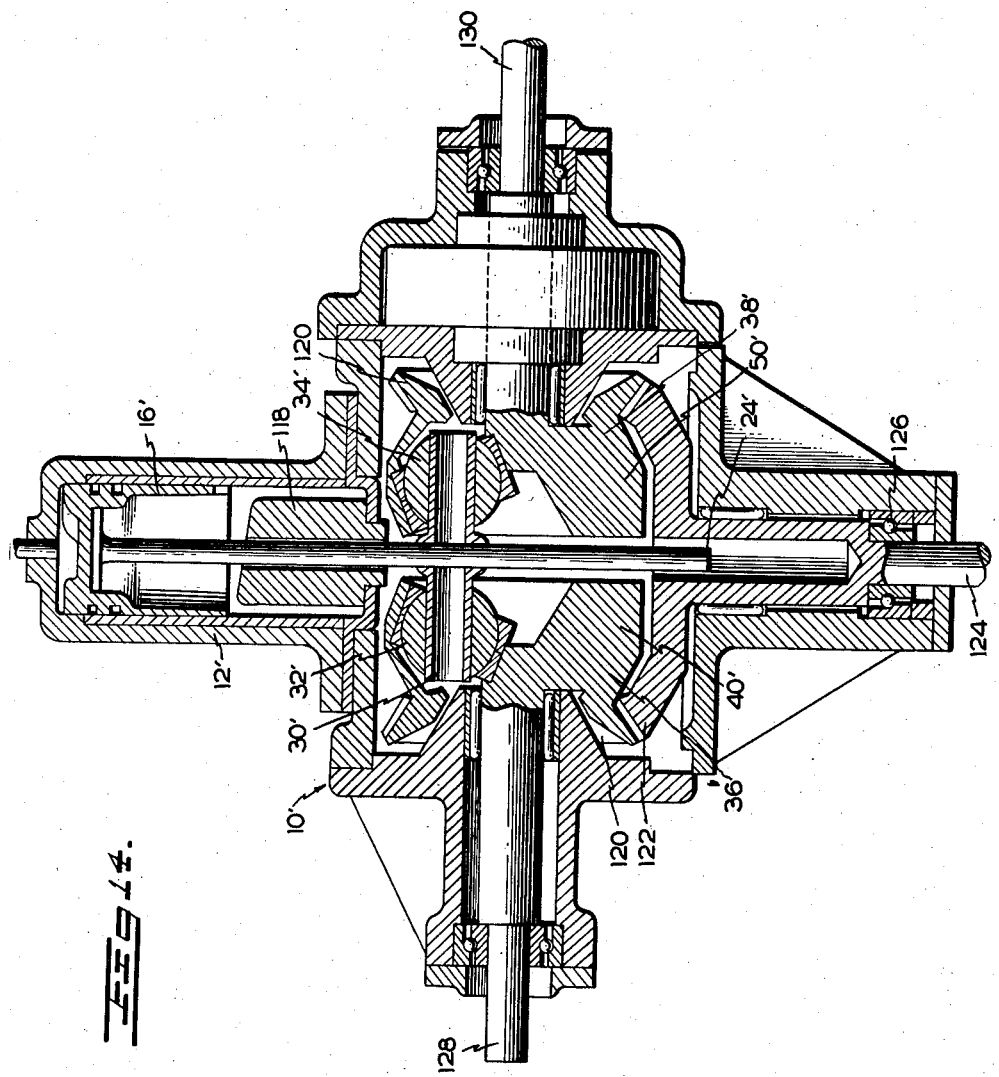
Fig. 14 is a sectional view of a modified form of the invention showing a single piston engine having a plurality of rotary power output shafts.

Referring to Fig. 14 of the drawings an engine which may be provided with the novel valving system of the present invention is shown wherein a single firing piston-cylinder arrangement is adapted to drive a plurality of rotary output shafts. In Fig. 14 a housing 10' carries at one end a cylinder 12' and a piston 16' reciprocally and rotatably mounted therein. The piston 16' is rigidly connected to a power rod 24' which passes through a block 118 and is secured to a shuttle rod 30'. The shuttle rod is journalled at each of its ends in bearings 32' to rotor elements 36' and 38' respectively.

The rotor elements 36' and 38' are in the form of a pair of fly wheels disposed on opposite sides of the shuttle rod and at right angles to the cylinder 12' as hereinbefore described in reference to the engine shown in Fig. 1. The rotor elements 36' and 38' include counter weights 40' and 50' respectively and the outer peripheral portions of each of the rotor elements is provided with bevelled gear portions 120 which gear portions mesh with bevel gear 122.

Bevel gear 122 is connected to shaft 124, rotatably mounted in the housing 10' by means of bearing 126. As the piston 16 reciprocates in cylinder 12', power rod 24' reciprocates axially in a straight line and drives shuttle bar 30' which is interconnected at its ends to the rotor elements 36' and 38' which transform the reciprocating motion into rotary motion.

Since the bevel gears 120 on the rotor 36' and 38' are in mesh with the complementary bevel gear 122, shaft 124 is also effectively rotated by the reciprocating piston 16' whereby a plurality of devices may be given at various speeds and in various directions through the operation of the single piston in a very economical and efficient manner.

As previously described in reference to the form of the invention shown in Fig. 1 as the shuttle bar 30' transforms the reciprocating motion of the power rod 24' through rotors 36' and 38' into rotary motion it oscillates back and forth at right angles to the longitudinal axis of the power rod 24'. This oscillation in turn rotates or oscillates power rod 24' and its connected piston 16' to open and close valve ports in the cylinder whereby the efficiency of a four cycle engine is achieved in the two cycle operation of the present invention.

In order to simplify the carbureting system of the engine shown in Figure 4 compressed air for scavenging the cylinder or compressed air to pressurize the fuel tank may be obtained by providing an outlet from the space between block 118 and the hollow piston 16', whereby, as the piston reciprocates to its lowermost position the air or fuel-air mixture within this space is compressed and utilized as is well known in the art.

Referring to Fig. 15 of the drawings there is shown a diagrammatic plan view of another type of engine in which the advantageous valve system of the invention may be employed wherein a plurality of internal combustion cylinders are arranged in pairs in rectilinear alignment one with another and located on opposite sides of the center line of the engine. Within the cylinders are mounted, for reciprocatory and rotary motion, pistons which reciprocate and rotate in common on a continuous straight line power rod 24".

The power rod 24" may be and preferably is constructed as a hollow tubular member through which a coolant such as air or a liquid coolant may be circulated to provide very efficient internal cooling of the pistons and their associated parts. In either case the hollow power rod 24" being harmonic and reciprocating along a single axis provides very efficient cooling by merely passing the coolant therethrough. It is to be pointed out that while the power rod 24" reciprocates the cooling medium whether air or liquid need not reciprocate therewith which substantially eliminates the disadvantages brought about by turbulence and added weight if the cooling medium, is also reciprocated. The piston-cylinder arrangement of each of the tandem units shown in this form of the invention may be double or single acting and the pistons and cylinders on each side of the center line may be alternately compressor and firing units or both of the piston-cylinder units on one side of the center line may be of the firing type while on the other side they may be utilized as compressors.

From the foregoing description it is evident that an extremely economical and efficient engine is provided which will have many and varied applications in various arts and it is to be understood that the particular configurations, arrangements, and constructions of parts as shown and described herein are merely for the purposes of illustration as it is also evident that there are numerous modifications hereof which fall within the intended spirit and scope of the present invention.

In the foregoing description certain terms have been used for brevity, clearness and understanding, but no unnecessary limitations are to be implied therefrom beyond the requirements of the prior art as such words were used for descriptive purposes only and are intended to be broadly construed within the limitations of the hereinafter appended claims.

Having now described the invention, the construction and operation thereof and the advantageous new and useful results obtained thereby, the new and useful constructions are set forth in the hereinafter appended claims.

I claim:

1. In an internal combustion engine-compressor device having opposed power and compressor cylinders, port openings in each of the cylinders, a power piston and a compressor piston for its respective cylinder, said pistons being rigidly interconnected by a rectilinear piston rod mounted for reciprocation and synchronized oscillation, the combination of cylindrical sleeves extending in opposite directions from each face of the compressor piston, depressed cylinder heads co-acting with said cylindrical sleeves and the compressor piston to provide opposed compression chambers, and ports in each of the sleeves cooperating with the ports in the compressor cylinder whereby the power piston and the ports in the compressor piston sleeves open and close the ports in their respective cylinders in predetermined, timed relation to the reciprocation and oscillation of the piston rod.

2. The invention defined in claim 1 wherein the innermost depressed cylinder head of the compressor cylinder is provided with a concentric bore for the passage of the rectilinear piston rod therethrough.

3. The invention defined in claim 1 including means connecting one of the compression chambers of the compressor cylinder with the power cylinder through a carburetor for supplying a fuel-air mixture to the power cylinder.

4. The invention defined in claim 2 including a container for a hydrocarbon fuel and said means connecting said one compression chamber with the power cylinder including a conduit connecting the exhaust outlet from said one compression chamber with the container and the carburetor and further conduit means connecting the outlet from the carburetor with the power cylinder.

5. The invention defined in claim 4 including a relief valve in said conduit means connecting the exhaust port of said compression chamber with said container to maintain a predetermined pressure in said container.

References Cited in the file of this patent

UNITED STATES PATENTS

| | | |
|---|---|---|
| 305,467 | Murray | Sept. 23, 1884 |
| 570,871 | Douthett | Nov. 3, 1896 |
| 1,363,548 | Ames | Dec. 28, 1920 |
| 1,402,573 | Clark | Jan. 3, 1922 |
| 1,619,696 | Bowen | Mar. 1, 1927 |
| 1,907,725 | Bracke | May 9, 1933 |
| 2,656,828 | Conover | Oct. 27, 1953 |
| 2,666,420 | Teisen | Jan. 19, 1954 |